(12) United States Patent
Lin et al.

(10) Patent No.: US 7,438,427 B2
(45) Date of Patent: Oct. 21, 2008

(54) INTEGRATION ROD

(75) Inventors: Hsin-Li Lin, Taipei (TW); Pi-Tsung Hsu, Taipei (TW); I-Pen Chien, Taipei (TW)

(73) Assignee: Premier Image Technology Corporation, Taipei (TW)

( * ) Notice: Subject to any disclaimer, the term of this patent is extended or adjusted under 35 U.S.C. 154(b) by 148 days.

(21) Appl. No.: 11/441,152

(22) Filed: May 26, 2006

(65) Prior Publication Data

US 2007/0013881 A1   Jan. 18, 2007

(30) Foreign Application Priority Data

Jul. 6, 2005   (TW) .............................. 94122914 A (51) Int. Cl.
*G02B 5/08* (2006.01)
*G02B 6/00* (2006.01)

(52) U.S. Cl. ...................................... 359/857; 385/133
(58) Field of Classification Search ................. 359/642, 359/726, 853, 855–857; 362/297, 301, 346; 385/125, 133
See application file for complete search history.

(56) References Cited

U.S. PATENT DOCUMENTS

2004/0071434 A1* 4/2004 Kawaai et al. .............. 385/146
2007/0110383 A1* 5/2007 Frei et al. .................... 385/133

* cited by examiner

*Primary Examiner*—William C Choi
(74) *Attorney, Agent, or Firm*—Bacon & Thomas, PLLC (57) ABSTRACT

An integration rod used in a projector. The integration rod includes a plurality of lenses that form the integration rod; a layer of high temperature hot-setting UV adhesive applied on the lenses to bond the lenses into a hollow rod structure; and a layer of ceramic adhesive applied on the hollow rod structure for stabilizing the hollow rod structure.

10 Claims, 9 Drawing Sheets

FIG. 9

INTEGRATION ROD

BACKGROUND OF THE INVENTION

1. Field of the Invention

The present invention relates to an integration rod for a projector, and more particularly, to an integration rod with a strengthened structure.

2. Description of the Related Art

An integration rod is an important optical element for a projector, and is usually a hollow rod with an inner reflective surface that reflects light many times to provide even illumination. The typical hollow integration rod utilizes a lens plated with a metal film to provide light reflection capabilities. However, the metal film can deform under high temperatures.

The typical hollow integration rod utilizes glue to fix a plurality of lenses into a predetermined shape (such as a hollow rectangular rod, or a hollow hexagonal rod). As a result, the characteristics of the glue may determine the structural strength and heat resistance capabilities of the hollow integration rod.

The typical glue has a working temperature range of about 100~150° C. When the internal working temperature rises, the strength of this glue decreases dramatically. The glue looses its ability to hold together the structure of the hollow integration rod, which can lead to the collapse of the hollow integration rod.

Since projectors are becoming increasingly popular, in order to provide clear and bright images, the typical projector utilizes a high power illumination device as a projector light source. As the light intensity of the projector increases, the working temperature may rise from 150° C. to 250° C., or even to 300° C. Under these high temperatures, the glue in the integration rod starts to get brittle, accelerating the potential for collapse of the integration rod.

In the industry, there are ceramic adhesives that are capable of enduring temperatures in excess of 1000° C. without suffering degradation. However, when this ceramic adhesive is used for long periods in high humidity environments, or in humid alkaline conditions, the glue may begin to hydrolyze, which reduces the adhesive capabilities of the glue, accelerating the collapse of the integration rod.

Therefore, it is desirable to provide an integration rod for use in a projector that mitigates and/or obviates the aforementioned problems.

SUMMARY OF THE INVENTION

In order to solve the above-mentioned problems, the present invention provides an integration rod with high temperature resistance and its assembly method.

The present invention provides an integration rod for a projector, the integration rod comprises: a plurality of lenses to form the integration rod; a layer of high temperature hot-setting UV adhesive applied on the lenses to bond the lenses into a hollow rod structure to form the integration rod; and a layer of ceramic adhesive applied on the hollow rod structure.

In an embodiment of the present invention, the plurality of lens are adhered together to form a hollow rectangular rod structure or a hollow hexagonal rod structure.

In an embodiment of the present invention, the high temperature hot-setting UV adhesive is applied from each end of the hollow rod structure to a point, wherein the distance between each end to the point is about one fourth the length of the hollow rod structure. Furthermore, the ceramic adhesive is applied along a distance from one fourth the length of the hollow rod structure to half the length of the hollow rod structure.

In an embodiment of the present invention, the high temperature hot-setting UV adhesive and the ceramic adhesive are all applied on the seams of each lens.

The present invention provides another integration rod for a projector. This integration rod has a plurality of lenses to form the integration rod; a first layer of high temperature hot-setting UV adhesive applied on the lenses to bond the lenses into a hollow rod structure to form the integration rod; a layer of ceramic adhesive applied on the hollow rod structure to stabilize the hollow rod structure; and a second layer of high temperature hot-setting UV adhesive applied on the ceramic adhesive layer.

In an embodiment of the present invention, the plurality of lens are adhered together to form a hollow rectangular rod structure or a hollow hexagonal rod structure.

In an embodiment of the present invention, the first layer of high temperature hot-setting UV adhesive is applied close to each end close of the hollow rod structure and along the seam of each lens of the hollow rod structure. The ceramic adhesive is applied along the seam of each lens of the hollow rod structure. The second layer of high temperature hot-setting UV adhesive is applied on the ceramic adhesive layer.

The present invention provides an assembly method for an integration rod, the integration rod capable of being used in a projector, the method comprises: providing a plurality of lenses, the lenses being used for forming the integration rod; applying a layer of high temperature hot-setting UV adhesive on the lenses and adhering together the lenses to form a hollow rod structure; using UV light to illuminate the hollow rod structure; applying a layer of ceramic adhesive on the hollow rod structure; and heating the hollow rod structure to stabilize the hollow rod structure.

In an embodiment of the present invention, the plurality of lens are adhered together to form a hollow rectangular rod structure or a hollow hexagonal rod structure.

In an embodiment of the present invention, the high temperature hot-setting UV adhesive is applied from each end of the hollow rod structure to a point, wherein the distance between each end to the point is about one fourth the length of the hollow rod structure. Furthermore, the ceramic adhesive is applied along a distance from one fourth the length of the hollow rod structure to half the length of the hollow rod structure.

In an embodiment of the present invention, the high temperature hot-setting UV adhesive and the ceramic adhesive are all applied on the seams of each lens.

Finally, the present invention provides another assembly method for an integration rod, the integration rod capable of being used in a projector, the method comprises: providing a plurality of lenses for forming the integration rod; applying a first layer of high temperature hot-setting UV adhesive on the lenses to bond the lenses into a hollow rod structure for forming the integration rod; using UV light to illuminate the hollow rod structure; applying a layer of ceramic adhesive on the hollow rod structure for stabilizing the hollow rod structure; applying a second layer of high temperature hot-setting UV adhesive on the ceramic adhesive layer; and heating the hollow rod structure to stabilize the hollow rod structure.

In an embodiment of the present invention, the plurality of lens are adhered together to form a hollow rectangular rod structure or a hollow hexagonal rod structure.

In an embodiment of the present invention, the first layer of high temperature hot-setting UV adhesive is applied close to each end close of the hollow rod structure and along the seam of each lens of the hollow rod structure. The ceramic adhesive is applied along the seam of each lens of the hollow rod structure. The second layer of high temperature hot-setting UV adhesive is applied on the ceramic adhesive layer.

Other objects, advantages, and novel features of the invention will become more apparent from the following detailed description when taken in conjunction with the accompanying drawings.

DETAILED DESCRIPTION OF THE PREFERRED EMBODIMENT

Generally, the typical high temperature hot-setting UV adhesive has the following advantages: it is suitable in highly humid environments, and in environments with alkaline moisture, while providing fast curing that improves production efficiencies. However, it also suffers from the following back draws: limited temperature range; when the temperature is too high, the adhesive capabilities are reduced. The typical inorganic ceramic adhesive has benefits, such as: having heat resistance above 1000° C.; not being affected by UV light illumination. However, it also suffers from the following back draws: it is not suitable in highly humid environments, and in environments with alkaline moisture.

In order to solve the above-mentioned problems, the present invention provides an integration rod using both a high temperature hot-setting UV adhesive and a ceramic adhesive to compromise their different back draws.

Figure 1:
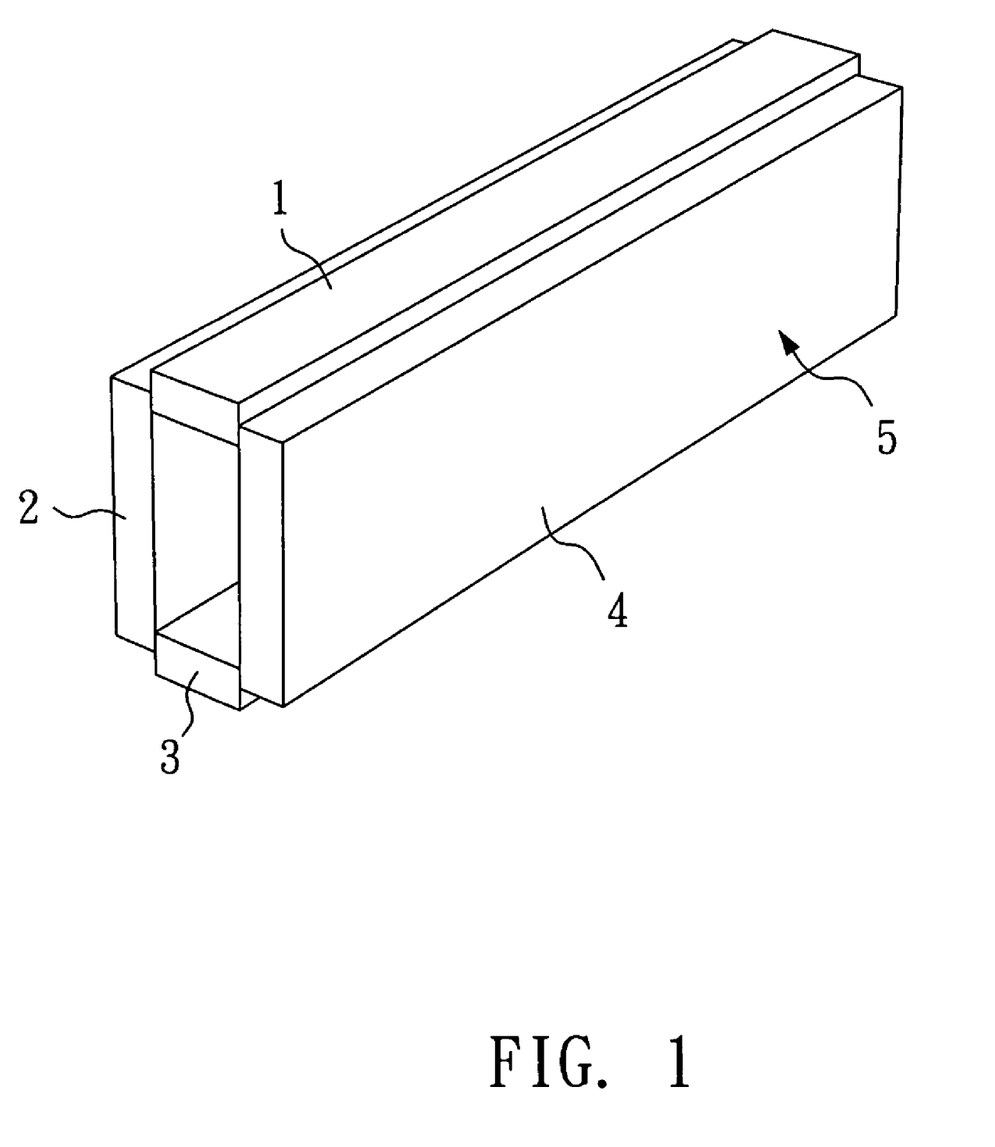
FIG. 1 is a perspective view of a hollow rod structure of a first embodiment according to the present invention.
Figure 2:
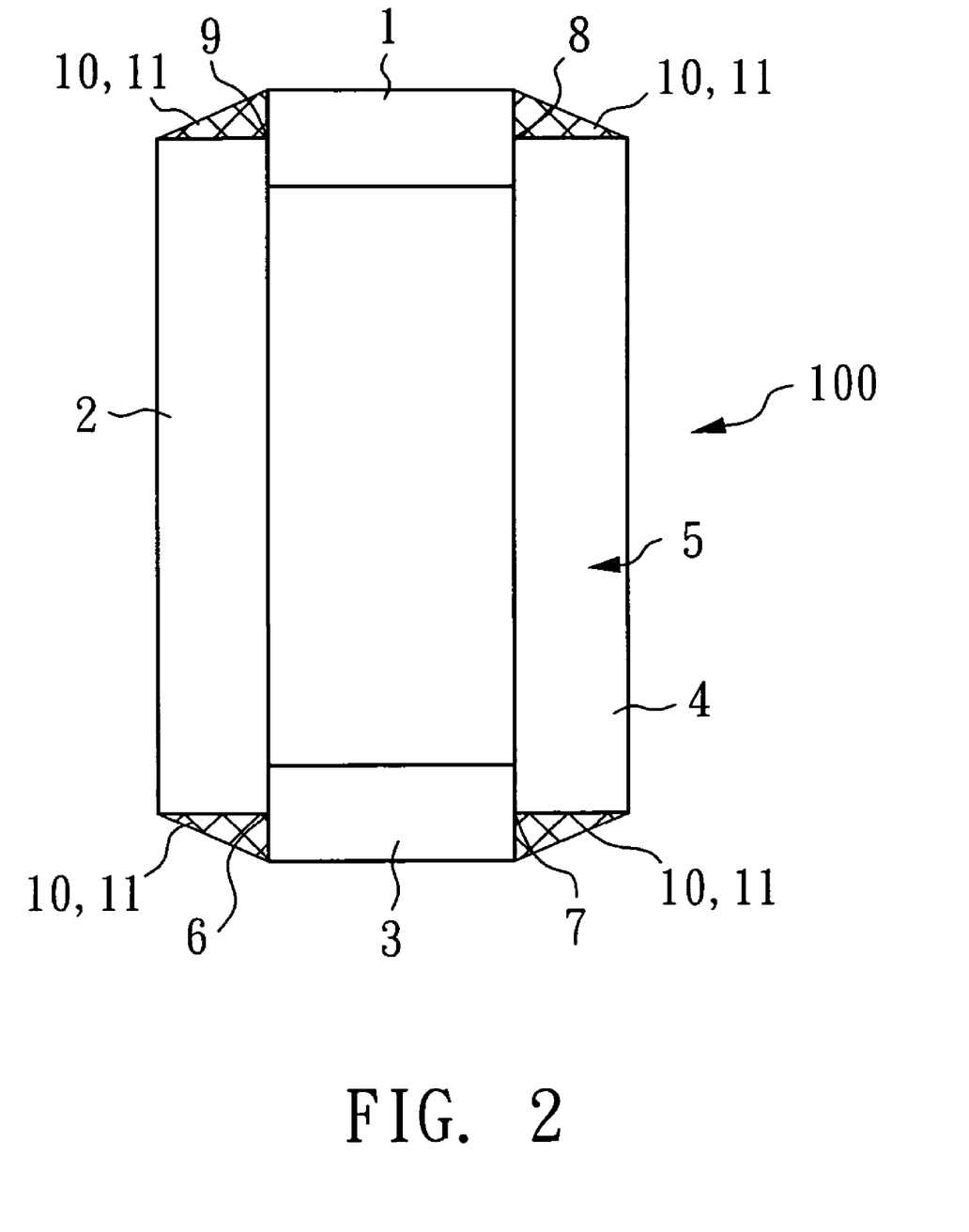
FIG. 2 is a front view of an integration rod of the first embodiment according to the present invention.
Figure 3:
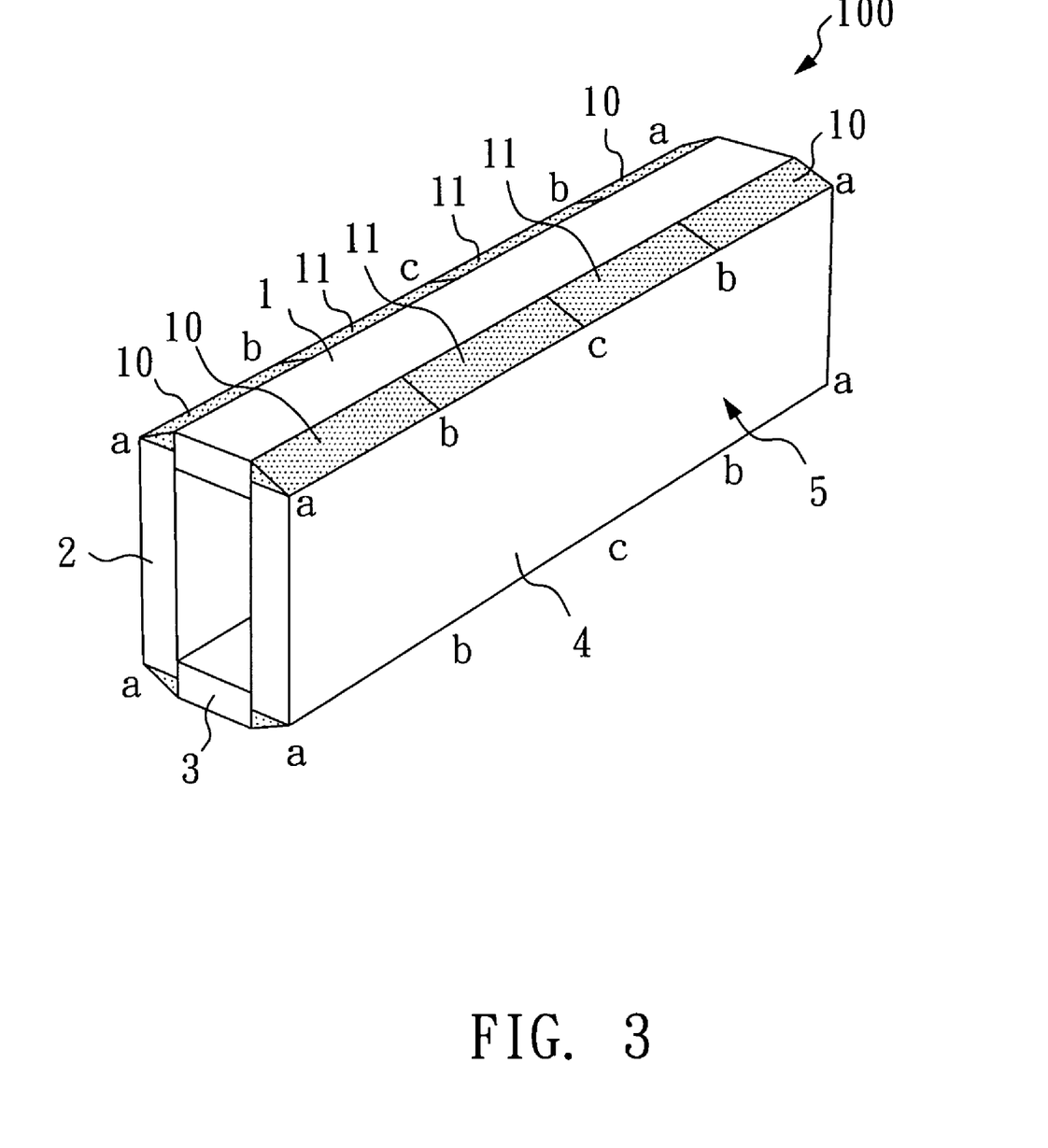
FIG. 3 is a perspective view of the integration rod of the first embodiment according to the present invention.

Please refer to FIG. 1 to FIG. 3, which show a hollow rod structure of a first embodiment according to the present invention. In a first embodiment of the present invention, an integration rod 100 with a hollow rectangular structure is provided, which is formed from a plurality of lenses 1, 2, 3 and 4, a high temperature hot-setting UV adhesive 10 and a ceramic adhesive 11.

As shown in FIG. 1, the plurality of lenses 1, 2, 3 and 4 are adhered together to form a hollow rod structure 5. The inner surface of the hollow rod structure 5 is plated with a metal film for light reflection.

As shown in FIG. 2 and FIG. 3, a layer of high temperature hot-setting UV adhesive 10 is applied on the plurality of lens 1, 2, 3 and 4 to adhere the plurality of lens 1, 2, 3 and 4 together to form the hollow rod structure 5. Furthermore, the present invention provides a layer of ceramic adhesive 11 that is applied on the hollow rod structure 5 to work with the high temperature hot-setting UV adhesive 10. The ceramic adhesive 11 is preferably an inorganic ceramic adhesive.

As shown in FIG. 2, in the first embodiment of the present invention, the high temperature hot-setting UV adhesive 10 and the ceramic adhesive 11 are separately applied on seams 6, 7, 8 and 9 of the plurality of lenses 1, 2, 3 and 4 of the hollow rod structure 5.

As shown in FIG. 3, in the first embodiment, the high temperature hot-setting UV adhesive 10 is applied from each end of the hollow rod structure 5 (marked as a) to a point that is at distance of about one fourth the length of the hollow rod structure 5 (marked as b). The ceramic adhesive 11 is applied from a point that is at distance of about one fourth the length of the hollow rod structure (marked as b) to half the length of the hollow rod structure (marked as c). Thus, the high temperature hot-setting UV adhesive 10 and the ceramic adhesive 11 are used together to seal the seams 6, 7, 8 and 9 of the plurality of lenses 1, 2, 3 and 4 of the hollow rod structure 5.

Figure 4:
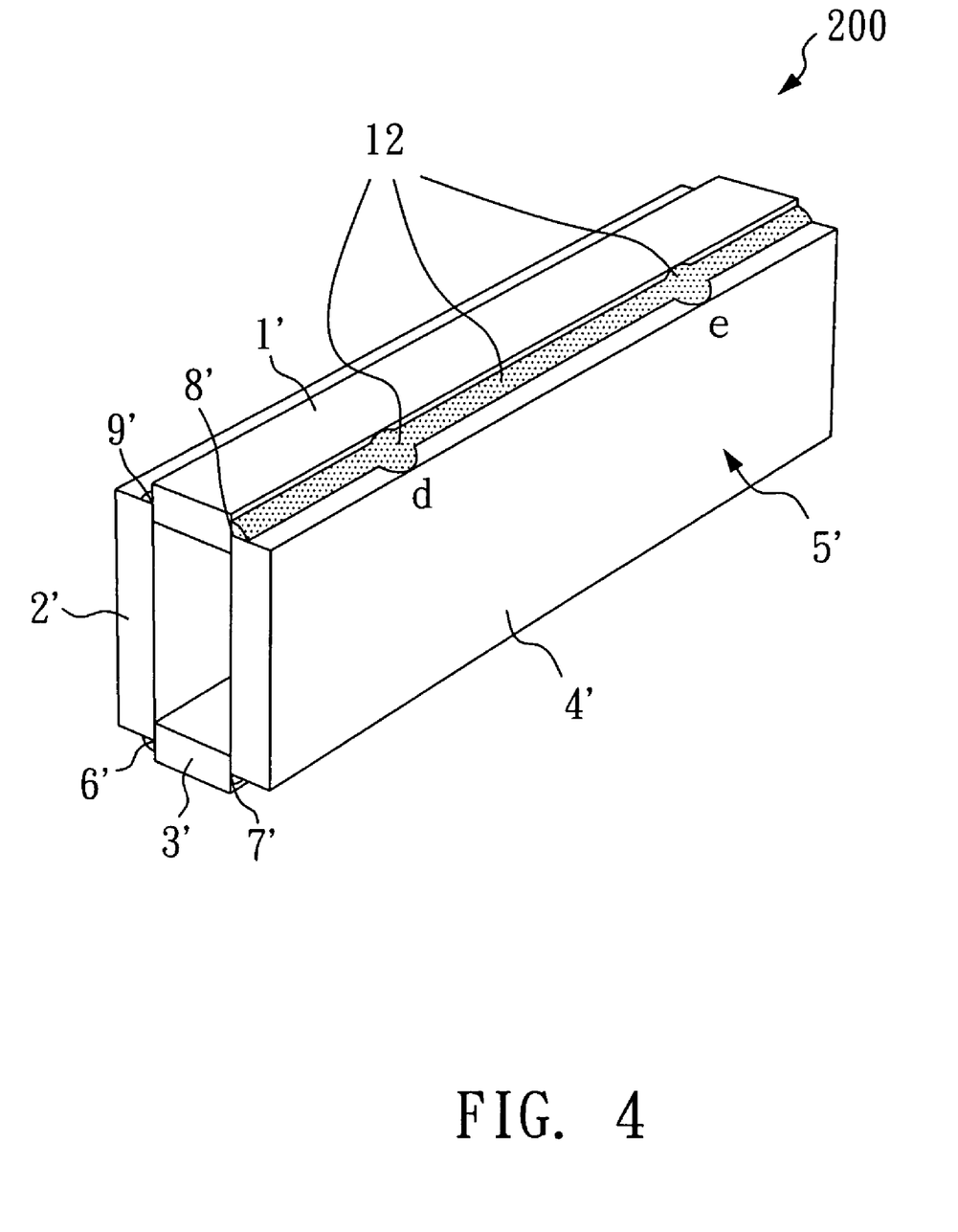
FIG. 4 is a perspective view of applying a first layer of high temperature hot-setting UV adhesive on the hollow rod structure in a second embodiment according to the present invention.
Figure 5:
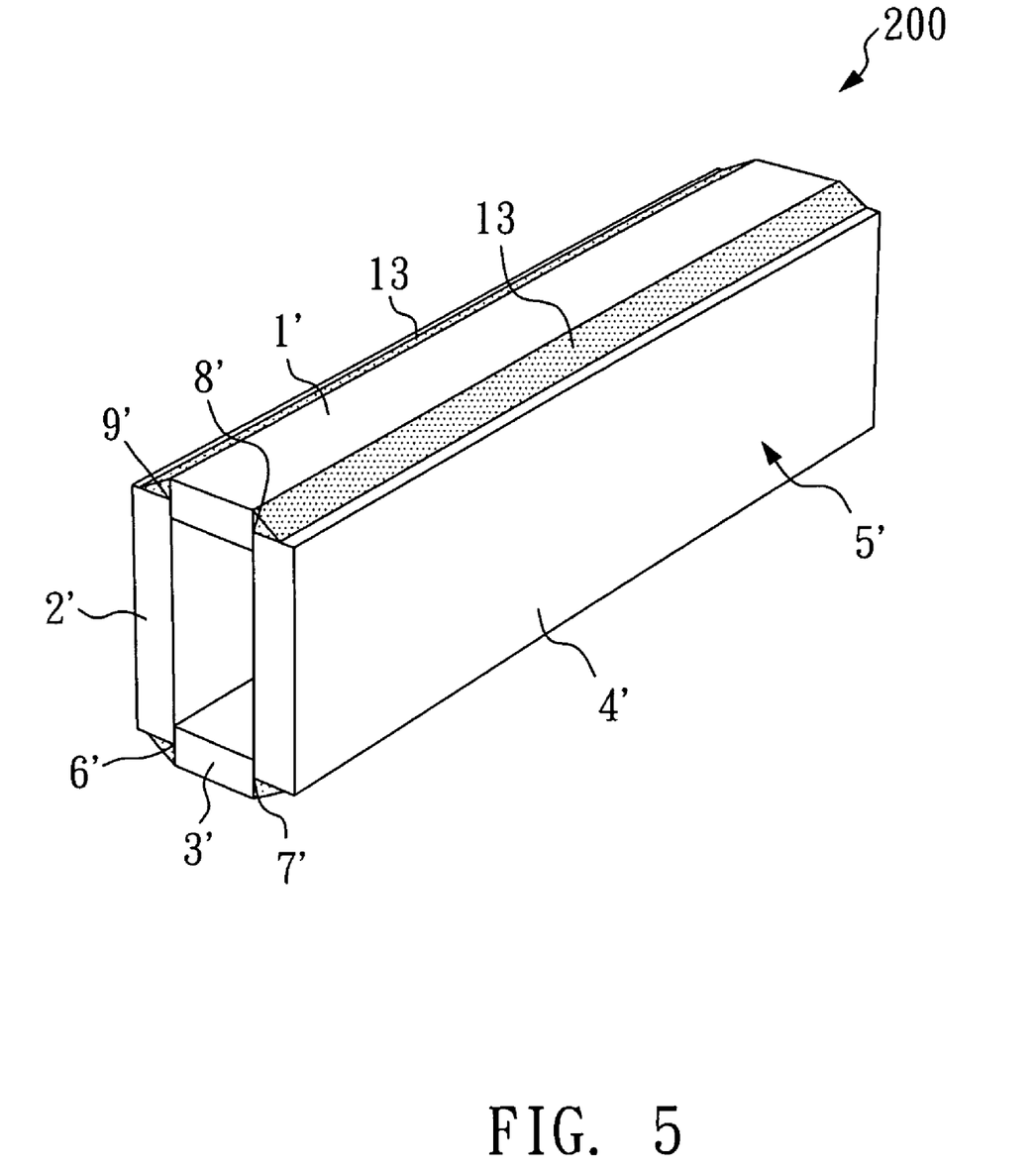
FIG. 5 is a perspective view of applying a layer of ceramic adhesive on the hollow rod structure in a second embodiment according to the present invention.
Figure 6:
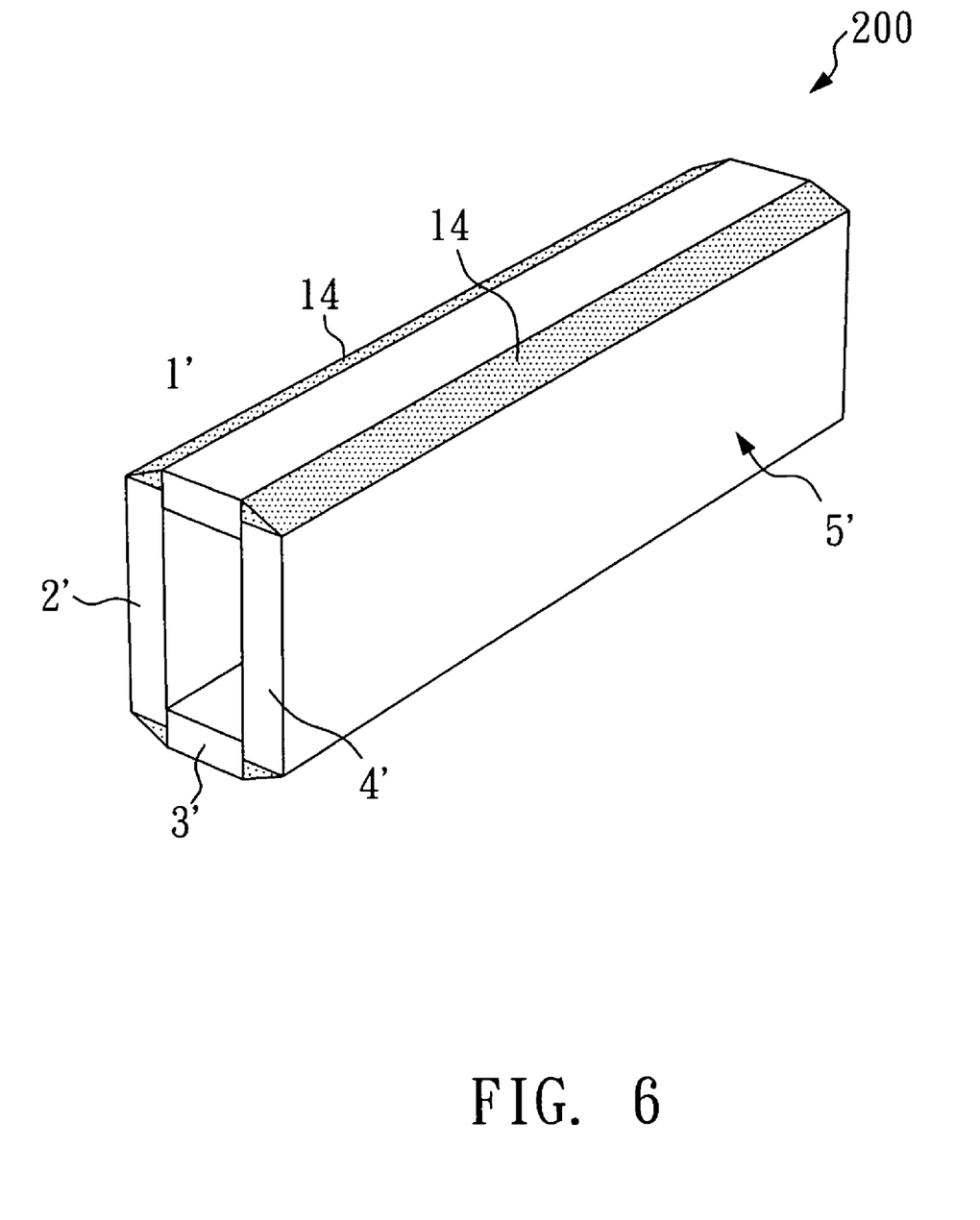
FIG. 6 is a perspective view of applying a second layer of high temperature hot-setting UV adhesive on the hollow rod structure in a second embodiment according to the present invention.
Figure 7:
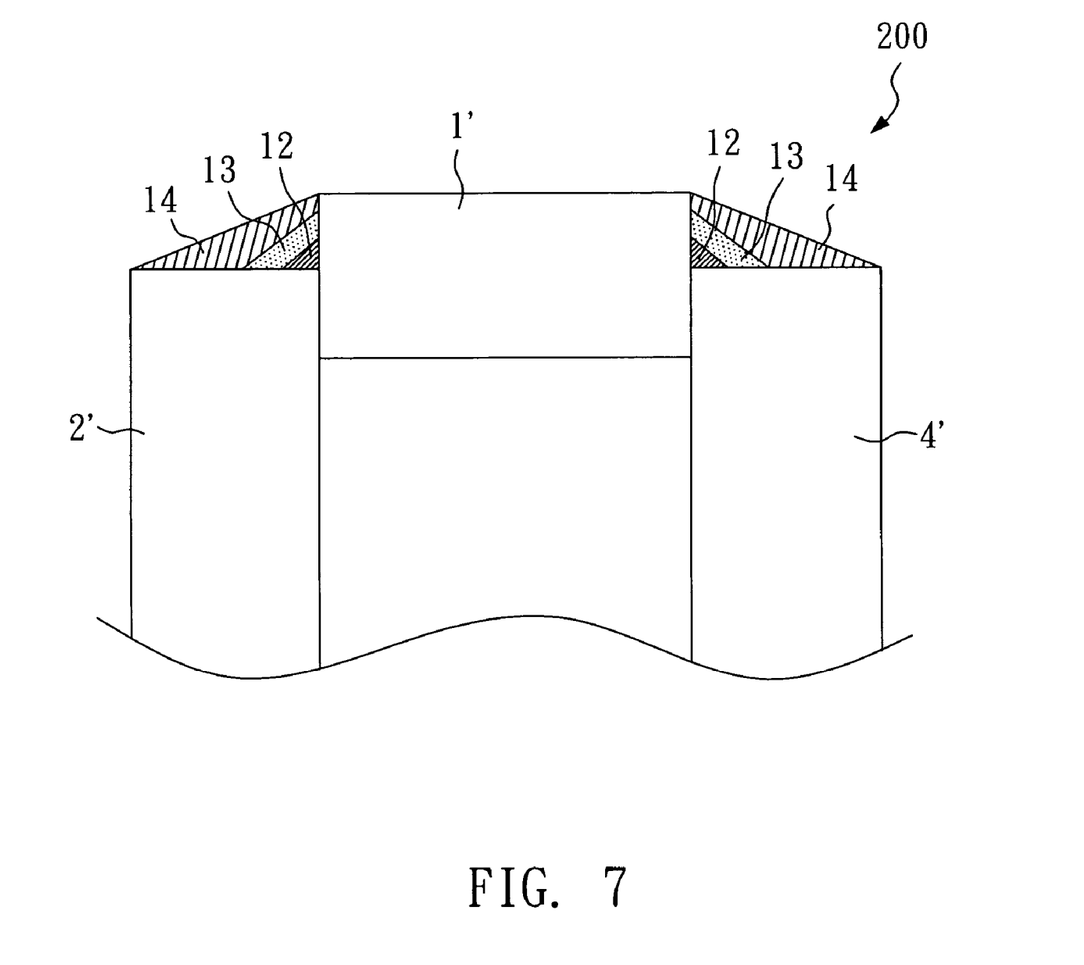
FIG. 7 is a side view of applying a first layer of high temperature hot-setting UV adhesive, a layer of the ceramic adhesive and a second layer of high temperature hot-setting UV adhesive on a hollow rod structure in a second embodiment according to the present invention.

Please refer to FIG. 4 to FIG. 7, which show a hollow rod structure of a second embodiment according to the present invention. As shown in FIG. 4 and FIG. 7, in the second embodiment of the present invention, an integration rod 200 is formed from a plurality of lenses 1', 2', 3' and 4'; a first layer of high temperature hot-setting UV adhesive 12; a layer of ceramic adhesive 13 and a second layer of high temperature hot-setting UV adhesive 14.

FIG. 4 shows the applying of the first layer of high temperature hot-setting UV adhesive 12 on the hollow rod structure 5' in the second embodiment according to the present invention.

As shown in FIG. 4, a first layer of high temperature hot-setting UV adhesive 12 is applied on the plurality of lenses 1', 2', 3' and 4' to bond the lenses 1', 2', 3' and 4' together to form the hollow rod structure 5', providing an integration rod 200. As shown in FIG. 4, in the second embodiment of the present invention, the first layer of high temperature hot-setting UV adhesive 12 is applied at positions (marked as d, e) close to each end of the hollow rod structure 5' and on the seams 6', 7', 8' and 9' of lenses 1', 2', 3' and 4'.

FIG. 5 shows the applying of a layer of ceramic adhesive on the hollow rod structure in the second embodiment according to the present invention. As shown in FIG. 5, a layer of ceramic adhesive 13 is applied on the hollow rod structure 5' to work with the first layer of high temperature hot-setting UV adhesive 12. The ceramic adhesive 13 is applied on the seams 6', 7', 8' and 9' of the plurality of lenses 1', 2', 3' and 4'. In this embodiment, the ceramic adhesive 13 is applied on the first layer of high temperature hot-setting UV adhesive 12.

FIG. 6 shows the applying of the second layer of high temperature hot-setting UV adhesive 14 on the hollow rod structure 5' in the second embodiment according to the present invention. As shown in FIG. 6, a second layer of high temperature hot-setting UV adhesive 14 is applied on the ceramic adhesive 13. In other words, the second layer of high temperature hot-setting UV adhesive 14 is also applied on the seams 6', 7', 8' and 9' of the lenses 1', 2', 3' and 4'.

FIG. 7 shows the applying of the first layer of high temperature hot-setting UV adhesive 12, the layer of the ceramic adhesive 13, and the second layer of high temperature hot-setting UV adhesive 14 on the hollow rod structure 5' in the second embodiment according to the present invention. As shown in FIG. 7, with the first layer of high temperature hot-setting UV adhesive 12, the ceramic adhesive 13 and the second layer of high temperature hot-setting UV adhesive 14, the seams 6', 7', 8' and 9' of the lenses 1', 2', 3' and 4' of the hollow rod structure 5' are sealed.

In the second embodiment, even when the second layer of high temperature hot-setting UV adhesive 12 is getting carbonization, it continues to cover the ceramic adhesive 13, reducing the possibility of the ceramic adhesive 13 coming into contact with outside moisture.

The present invention also provides assembly methods for the above-mentioned integration rods 100 and 200. Please refer to FIG. 8 to FIG. 9 for flow charts of the assembly methods for the integration rods 100 and 200.

Figure 8:
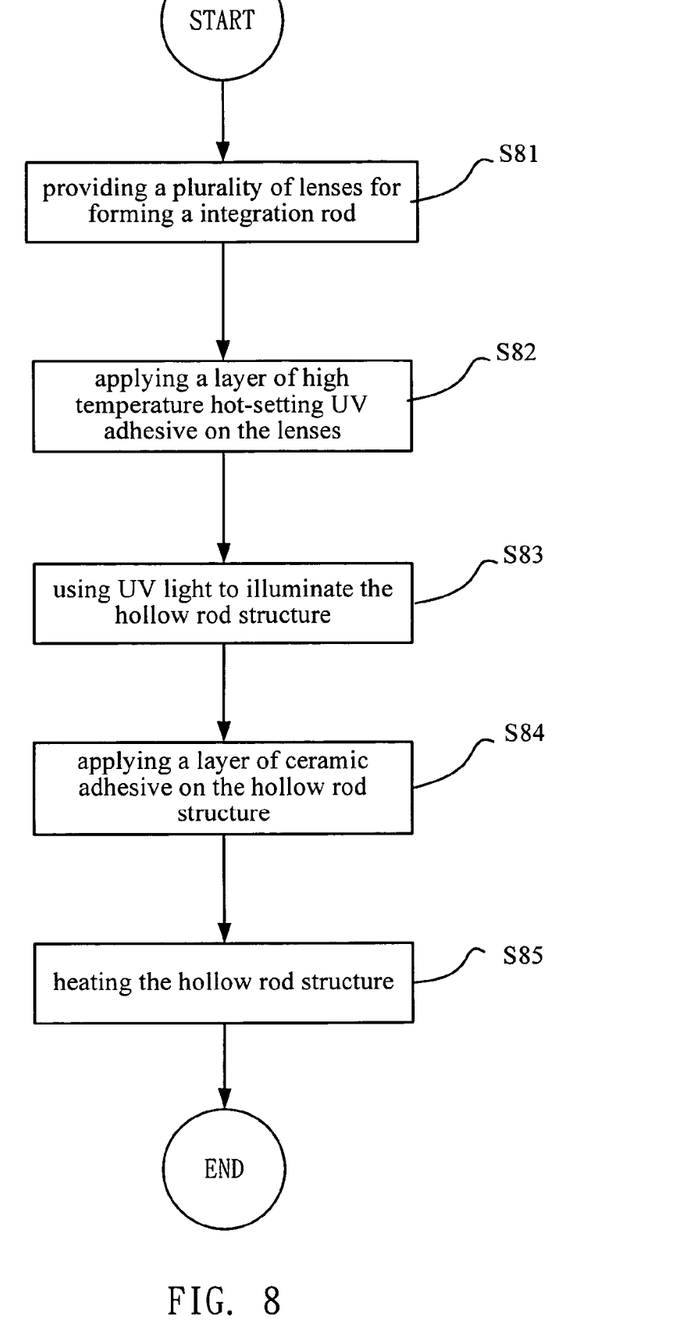
FIG. 8 is a flow chart of an assembly method for an integration rod in a first embodiment according to the present invention.

As shown in FIG. 8, the assembly method of the integration rod 100 comprises steps S81, S82, S83, S84 and S85.

First, in step S81, the lenses 1, 2, 3 and 4 are provided for the formation of the hollow rod structure 5.

Next, in step S82, a high temperature hot-setting UV adhesive 10 is applied onto the plurality of lenses 1, 2, 3 and 4 and bonds the lenses 1, 2, 3 and 4 together to form the hollow rod structure 5. In step S82, the high temperature hot-setting UV adhesive 10 is applied onto the seams 6, 7, 8 and 9 of the hollow rod structure 5. The high temperature hot-setting UV adhesive 10 is applied onto hollow rod structure 5 from each end of the hollow rod structure 5 (marked by an a) to a point at distance of about one fourth the length of the hollow rod structure 5 (marked as b).

In step S83, UV light is used to illuminate the hollow rod structure 5 to harden the high temperature hot-setting UV adhesive 10 to fix the hollow rod structure 5.

In step S84, a ceramic adhesive 11 is applied on the hollow rod structure 5. In step S84, the ceramic adhesive 11 is applied on the seams 6, 7, 8 and 9 of the plurality of lenses 1, 2, 3 and 4 of the hollow rod structure 5. The ceramic adhesive 11 is applied at a distance from one fourth the length of the hollow rod structure (marked by a b) to half the length of the hollow rod structure (marked as c).

Finally, in step S85, the hollow rod structure 5 is heated to secure it and to finish the assembly steps of the integration rod 100. In one embodiment of the present invention, the integration rod 100 can baked in an oven for the heating step of the hollow rod structure 5.

Figure 9:
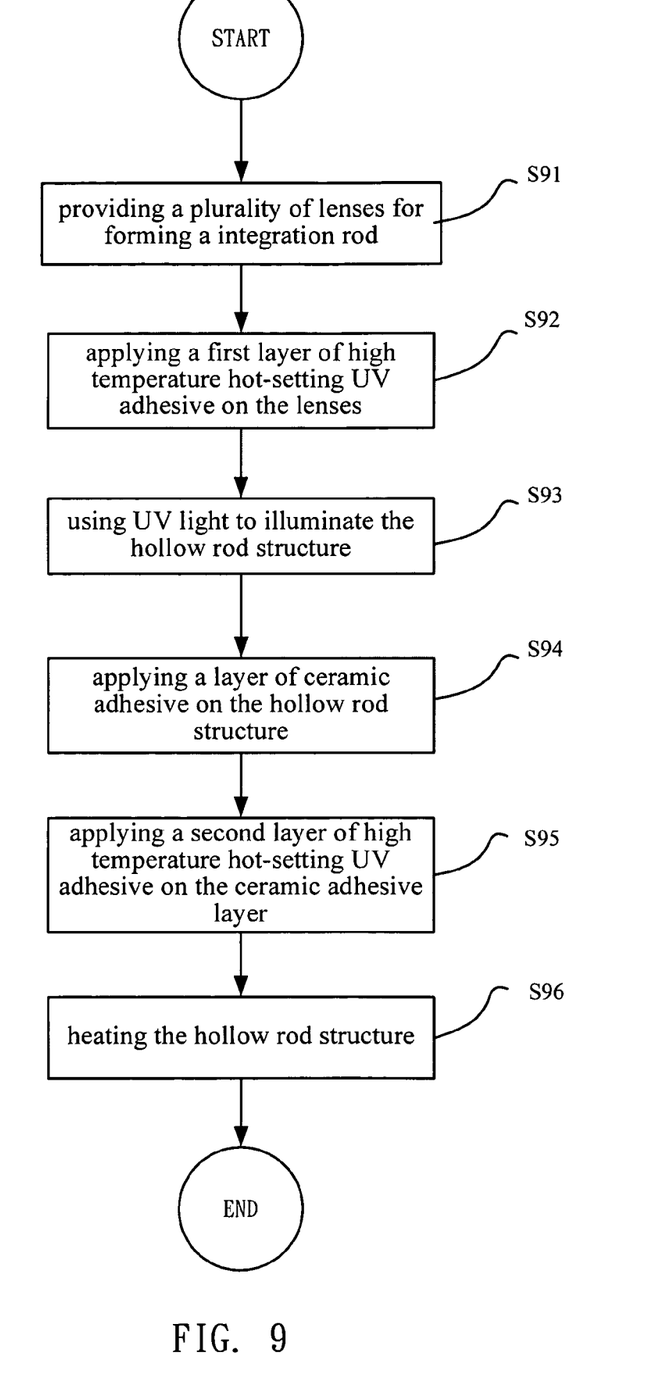
FIG. 9 is a flow chart of an assembly method for an integration rod in a second embodiment according to the present invention.

As shown in FIG. 9, the assembly method of the integration rod 200 comprises steps S91, S92, S93, S94, S95 and S96.

First, in step S91, the plurality of lens 1', 2', 3' and 4' are provided for the formation of the hollow rod structure 5'.

Next, in step S92, a first layer of high temperature hot-setting UV adhesive 12 is applied on the plurality of lens 1', 2', 3' and 4' and adheres the lenses 1', 2', 3' and 4' together to form the hollow rod structure 5'. In step S92, the first layer of high temperature hot-setting UV adhesive 12 is applied on the seams 6', 7', 8' and 9' of the hollow rod structure 5'. Moreover, the first layer of high temperature hot-setting UV adhesive 12 is also applied at positions (marked as d and e) close to each end of the hollow rod structure 5'.

In step S93, UV light is used to illuminate the hollow rod structure 5' to harden the high temperature hot-setting UV adhesive 12 to fix the hollow rod structure 5'.

In step S94, the ceramic adhesive 13 is applied on the seams 6', 7', 8' and 9' of the lenses 1', 2', 3' and 4' of the hollow rod structure 5'.

Next, in step S95, the second layer of high temperature hot-setting UV adhesive 14 is applied on the seams 6', 7', 8' and 9' of the lenses 1', 2', 3' and 4' of the hollow rod structure 5'. The second layer of high temperature hot-setting UV adhesive 14 is applied on the ceramic adhesive 13.

Finally, in step S96, the hollow rod structure 5' is heated to stabilize it and finish the assembly steps of the integration rod 200. In one embodiment of the present invention, the integration rod 200 can be placed into an oven for baking to finish the heating step of the hollow rod structure 5'.

Although the present invention has been explained in relation to its preferred embodiment, it is to be understood that many other possible modifications and variations can be made without departing from the spirit and scope of the invention as hereinafter claimed.

What is claimed is:

1. An integration rod for use in a projector comprising:
    a plurality of lenses to form the integration rod;
    a first layer of high temperature hot-setting UV adhesive applied on the lenses to bond the lenses into a hollow rod structure to form the integration rod;
    a layer of ceramic adhesive applied on the hollow rod structure to stabilize the hollow rod structure; and
    a second layer of high temperature hot-setting UV adhesive applied on the ceramic adhesive layer.

2. The integration rod as claimed in claim 1, wherein the lenses are adhered together to form a hollow rectangular rod structure.

3. The integration rod as claimed in claim 1, wherein the lenses are adhered together to form a hollow hexagonal rod structure.

4. The integration rod as claimed in claim 1, wherein the first layer of high temperature hot-setting UV adhesive is applied close to each end of the hollow rod structure and along the seam of each lens of the hollow rod structure.

5. The integration rod as claimed in claim 4, wherein the ceramic adhesive is applied along the seam of each lens of the hollow rod structure.

6. An assembly method for an integration rod, the integration rod capable of being used in a projector, the method comprising:
    providing a plurality of lenses for forming the integration rod;
    applying a first layer of high temperature hot-setting UV adhesive on the lenses to bond the lenses into a hollow rod structure for forming the integration rod;
    using UV light to illuminate the hollow rod structure;
    applying a layer of ceramic adhesive on the hollow rod structure for stabilizing the hollow rod structure;
    applying a second layer of high temperature hot-setting UV adhesive on the ceramic adhesive layer; and
    heating the hollow rod structure to stabilize the hollow rod structure.

7. The assembly method as claimed in claim 6, wherein in the step of adhering together the plurality of lenses, the lenses are adhered together to form a hollow rectangular rod structure.

8. The assembly method as claimed in claim 6, wherein in the step of adhering together the plurality of lenses, the lenses are adhered together to form a hollow hexagonal rod structure.

9. The assembly method as claimed in claim 6 wherein in the step of applying the first layer of high temperature hot-setting UV adhesive on the plurality of lenses, the first layer of high temperature hot-setting UV adhesive is applied close to each end of the hollow rod structure and along the seam of each lens of the hollow rod structure.

10. The assembly method as claimed in claim 9, wherein in the step of applying the ceramic adhesive on the hollow rod structure, the ceramic adhesive is applied along the seam of each lens of the hollow rod structure.

* * * * *